(12) United States Patent
Aberle

(10) Patent No.: US 12,434,744 B2
(45) Date of Patent: Oct. 7, 2025

(54) DOOR ASSEMBLIES FOR INSULATED BOXCARS AND REFRIGERATED BOXCARS

(71) Applicant: Gunderson LLC, Portland, OR (US)

(72) Inventor: Dan Aberle, Vancouver, WA (US)

(73) Assignee: Gunderson LLC, Lake Oswego, OR (US)

( * ) Notice: Subject to any disclaimer, the term of this patent is extended or adjusted under 35 U.S.C. 154(b) by 762 days.

(21) Appl. No.: 17/839,132

(22) Filed: Jun. 13, 2022

(65) Prior Publication Data

US 2023/0399034 A1  Dec. 14, 2023

(51) Int. Cl.
*B61D 17/18* (2006.01)
*B61D 19/00* (2006.01)
(Continued)

(52) U.S. Cl.
CPC ........... *B61D 17/18* (2013.01); *B61D 19/001* (2013.01); *B65D 90/008* (2013.01); *F25D 23/02* (2013.01); *F25D 23/021* (2013.01); *F25D 23/028* (2013.01)

(58) Field of Classification Search
CPC ...... F25D 23/028; F25D 23/02; F25D 23/021; B65D 90/008; B61D 17/18; B61D 19/001
See application file for complete search history.

(56) References Cited

U.S. PATENT DOCUMENTS 2,583,646 A * 1/1952 Haseltine ............. B61D 19/009
  292/161
3,334,441 A * 8/1967 Landis ................ E05D 15/1007
  49/449

(Continued)

FOREIGN PATENT DOCUMENTS

CA  2990922 A1 * 7/2018 ............. A47F 3/043
CN  205418643 U  8/2017
(Continued)

OTHER PUBLICATIONS

Spenle, Swing insulated door (positive T°)—SP200 [on-line], [retrieved on Jun. 10, 2022]. Retrieved from the Internet <URL:www.spenle-international.com/en/products/food-industry/insulated-doors/swing-insulated-door-positive-t-sp200>.
(Continued)

*Primary Examiner* — S. Joseph Morano
*Assistant Examiner* — Cheng Lin
(74) *Attorney, Agent, or Firm* — Chernoff, Vilhauer, McClung & Stenzel, LLP

(57) ABSTRACT

Door assemblies for insulated boxcars and refrigerated boxcars are disclosed. In some embodiments, the door assemblies include a generally planar base, a liner spaced from the rear surface of the base. The liner includes a central portion and a perimeter portion surrounding the central portion. The door assemblies additionally include a perimeter gasket attached to the perimeter portion and surrounding the central portion. The door assemblies further include first and second end wall members. The base, the liner, and the first and second end wall members define an interior compartment therebetween. The door assemblies additionally include insulation disposed within the interior compartment, wherein the first and second end wall members are shaped such that insulation is disposed within one or more planes that are perpendicular to the base and to the perimeter portion of the liner and that include a portion of the perimeter gasket.

17 Claims, 13 Drawing Sheets

(51) Int. Cl.
  *B65D 90/00*  (2006.01)
  *F25D 23/02*  (2006.01)

(56) References Cited

U.S. PATENT DOCUMENTS

| | | | |
|---|---|---|---|
| 3,934,785 A | | 1/1976 | Malo |
| 7,305,923 B2 | * | 12/2007 | Creighton .......... B61D 27/0081 |
| | | | 410/116 |
| 7,434,520 B2 | * | 10/2008 | Zupancich .......... B61D 19/001 |
| | | | 105/423 |
| 7,478,600 B2 | | 1/2009 | Beers et al. |
| 8,176,682 B2 | * | 5/2012 | Gaviglia .................. E06B 5/20 |
| | | | 49/501 |
| 8,869,493 B2 | | 10/2014 | Chubb et al. |
| 9,310,123 B2 | * | 4/2016 | Guarino .................. F25D 23/02 |
| 9,476,633 B2 | * | 10/2016 | Allard .................... F25D 23/028 |
| 9,885,210 B2 | | 2/2018 | Haynes |
| 11,221,174 B2 | * | 1/2022 | Osgard .................... F25D 21/12 |
| 2005/0252913 A1 | * | 11/2005 | Zupancich ........... B65D 90/008 |
| | | | 220/1.6 |
| 2006/0065152 A1 | | 3/2006 | Heitmeyer |
| 2006/0108361 A1 | * | 5/2006 | Seiter .................. B65D 90/008 |
| | | | 220/1.5 |
| 2006/0220328 A1 | * | 10/2006 | Deaver .................... B60J 10/80 |
| | | | 277/644 |
| 2007/0034110 A1 | | 2/2007 | Zupancich et al. |
| 2007/0068418 A1 | | 3/2007 | Heitmeyer et al. |
| 2010/0269450 A1 | | 10/2010 | Thielmann |

FOREIGN PATENT DOCUMENTS

| | | | | |
|---|---|---|---|---|
| CN | 206376703 U | | 8/2017 | |
| CN | 112747546 A | * | 5/2021 | ............. F25D 11/00 |
| KR | 200239823 Y1 | * | 11/2001 | |
| KR | 20220005222 A | * | 1/2022 | |
| WO | 2014019622 A1 | | 2/2014 | |
| WO | 2014019625 A1 | | 2/2014 | |

OTHER PUBLICATIONS

Spenle, Sliding insulated door (positive T°)—SP400 [on-line], [retrieved on Jun. 10, 2022]. Retrieved from the Internet URL:www.spenle-international.com/en/products/food-industry/insulated-doors/sliding-insulated-door-positive-t-sp400>.

* cited by examiner

DOOR ASSEMBLIES FOR INSULATED BOXCARS AND REFRIGERATED BOXCARS

BACKGROUND OF THE INVENTION

The present application relates to railroad cars and, in particular, to door assemblies for insulated boxcars and refrigerated boxcars.

Existing boxcars typically include opposed side walls, opposed bulkheads, a floor, a roof, and at least one doorway together defining a cargo-carrying enclosure that is mounted upon a supporting undercarriage with a wheel assembly for movement upon a railroad track. A typical existing boxcar will include a supporting undercarriage having a longitudinal center sill, body bolsters, side sills, cross bearers, and cross ties that are each made of iron, steel, or other rigid metal. This undercarriage may then support the side walls, bulkheads, and roof, which are also typically of metal construction.

Though the boxcar construction just described is adequate to transport heavy loads, such boxcars are often insufficient to transport over large distances perishable cargo or other cargo that must be maintained at a low temperature. One existing solution is to construct an insulated boxcar or a refrigerated boxcar capable of maintaining a desired temperature of enclosed cargo by preventing heat from entering the enclosure. For example, a typical insulated railway boxcar includes an enclosed structure having an outer surface, usually of metal, one or more layers of foam or fiber insulation, and an interior surface of metal, though the interior surface is sometimes formed from wood and/or fiber-reinforced composite material as desired for the specific application. An alternative to an insulated boxcar is a refrigerated boxcar that uses a refrigeration unit to maintain the interior of the boxcar enclosure at a desired temperature and also may include one or more layers of foam or fiber insulation. One problem with insulated boxcars and refrigerated boxcars is that a large portion of heat transfer occurs from their door assemblies.

What is desired, then, are improved door assemblies for insulated boxcars and refrigerated boxcars that substantially reduces the heat transfer that occurs from those door assemblies.

SUMMARY OF THE INVENTION

A door assembly as disclosed herein provides answers to some of the previously-mentioned shortcomings of previously known door assemblies.

In one embodiment, the door assembly includes a door frame, a door liner, and a rubber gasket attached to the door frame and the door liner. The door frame is shaped to provide a void that is directly behind the gasket sealing surface and that receives insulation material.

In one embodiment, the door assembly includes horizontal lockbars that are curved such that portions of the lockbars are disposed between connection pipe assemblies and a base of the door assembly.

In one embodiment, an insulated boxcar or refrigerated boxcar includes the above door assembly.

In one embodiment, the insulated boxcar or refrigerated box car includes a continuous steel door frame that provides a continuous sealing surface for the rubber gasket.

In one embodiment, the refrigerated boxcar includes a fuel tank mounted to an end wall of the boxcar.

In one embodiment, the refrigerated boxcar includes an end wall having keyhole-shaped slots that allow easy access to carriage bolts.

The foregoing and other objectives and features will be more readily understood upon consideration of the following detailed description taken in conjunction with the accompanying drawings.

BRIEF DESCRIPTION OF THE SEVERAL DRAWINGS

DETAILED DESCRIPTION OF PREFERRED EMBODIMENTS

Figure 1:
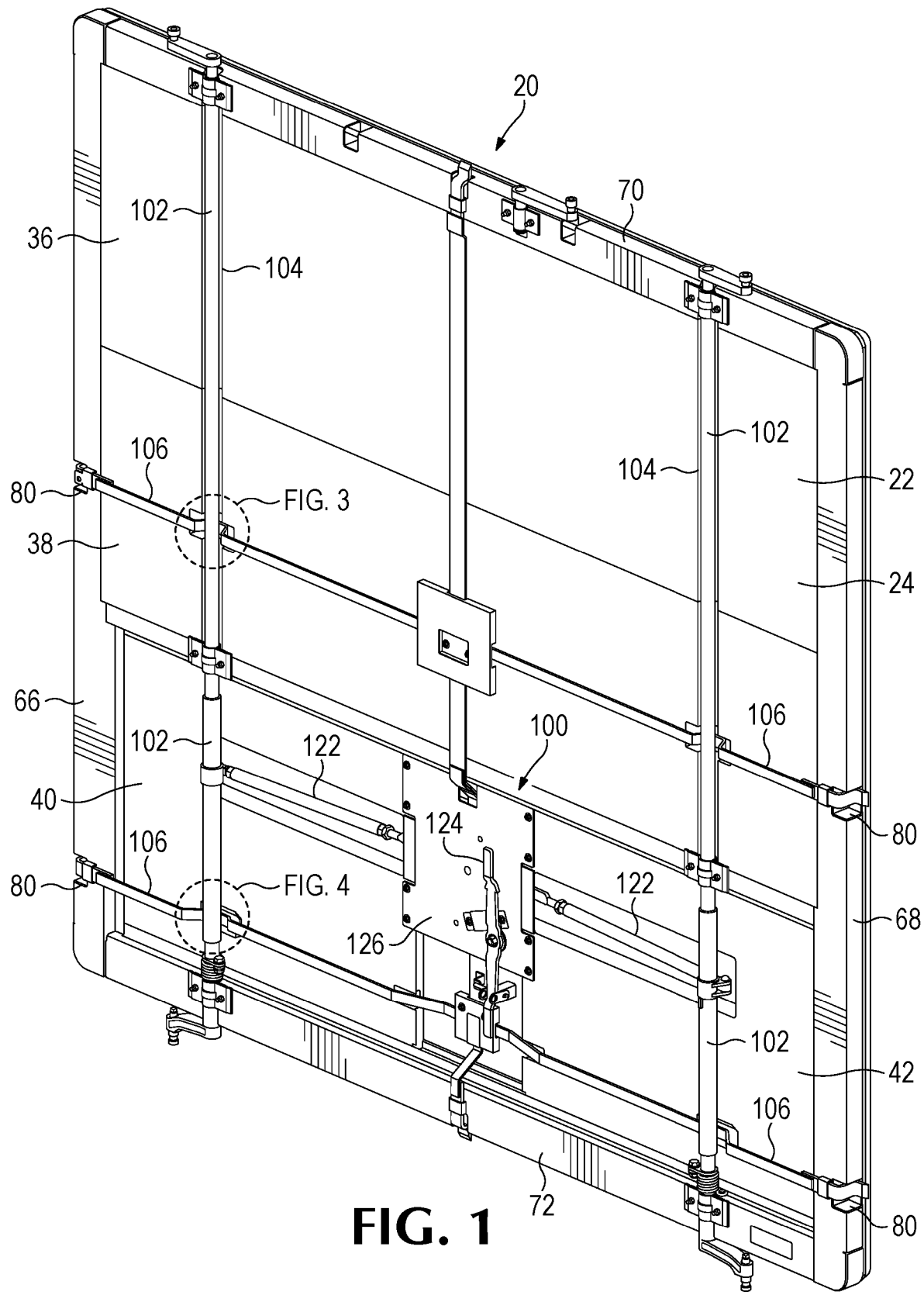
FIG. 1 is an isometric view of an example of a door assembly of the present disclosure.
Figure 2:
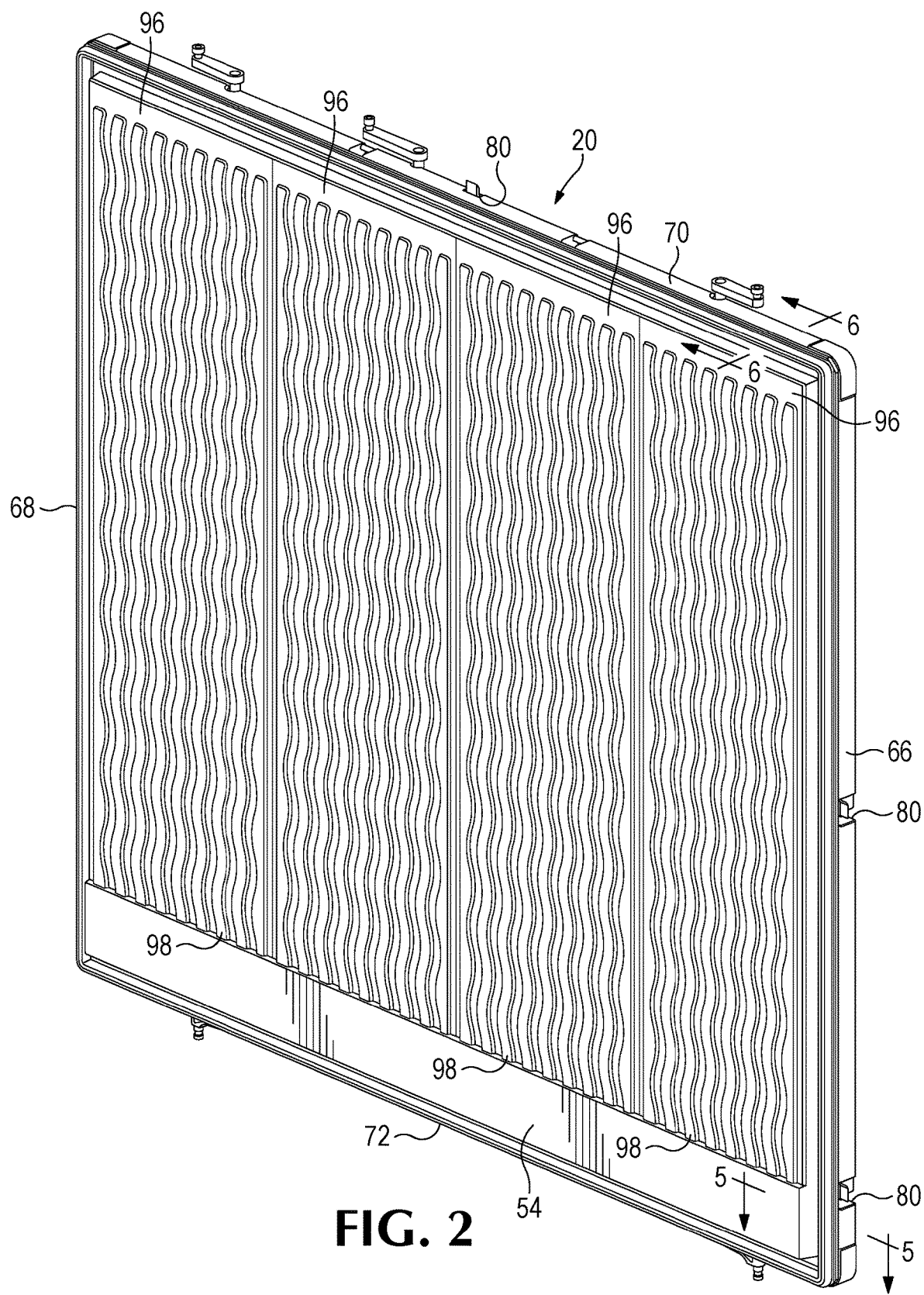
FIG. 2 is a reverse isometric view of the door assembly of FIG. 1.

Referring now to the drawings that form a portion of the disclosure herein, FIGS. 1-8 show a door or door assembly 20 for insulated boxcars and/or refrigerated boxcars incorporating a novel construction that substantially reduces heat transfer. Door assembly 20 includes a planar or generally planar base 22 having a front surface 24 and a rear surface 26. The base also includes opposed horizontal end portions 28 and 30, and opposed vertical end portions 32 and 34. In the example shown in FIGS. 1-8, base 22 includes a first planar panel 36, a second planar panel 38, a third planar panel 40, and a fourth planar panel 42 that are welded and/or otherwise attached to each other. In other examples, base 22 may include more or less planar panels (including a single planar panel).

Door assembly 20 additionally includes a liner 44 that is spaced from rear surface 26 of base 22. Liner 44 includes a central wall or portion 46, a perimeter wall or portion 48 that surrounds the central wall or portion, and a connecting wall or portion 50 disposed between the central portion and the perimeter portion. The central, perimeter, and connecting portions are planar and/or generally planar. The liner is shaped such that central portion 46 is spaced further from base 22 relative to perimeter portion 48. In the example shown in FIGS. 1-8, the central portion and the perimeter portion are parallel or generally parallel to each other, while connecting portion is perpendicular or generally perpendicular to the central and perimeter portions. Liner 44 may be formed as a unitary piece having the central, perimeter, and connecting portions, or may alternatively be separate pieces attached to each other. In the example shown in FIGS. 1-8, central portion 46 includes an elevated part 52 that is spaced further relative to the remainder of the central portion. Liner 44 may be made of any suitable material(s), such as fiberglass.

Door assembly 20 further includes an elongate perimeter gasket 54 having an opening 56 to receive central portion 46. The perimeter gasket is attached to perimeter portion 48 such that perimeter gasket 54 surrounds central portion 46. For example, a gasket retainer 58 is attached to, or formed with, the perimeter portion and receives perimeter gasket 54. In the example shown in FIGS. 1-8, perimeter gasket 54 includes wing portions 60 that are received in a channel 62 of the gasket retainer. Perimeter gasket 54 may be any suitable material(s), such as rubber and/or silicone.

Door assembly 20 additionally includes a plurality of end wall members 64 that attach base 22 and liner 44 together and that span a corresponding side or end portion of base 22 and liner 44. In the example shown in FIGS. 1-8, end wall members 64 include a first end wall member 66, a second end wall member 68, and a third end wall member 70, and a fourth end wall member 72 that attach (e.g., welded) to a corresponding side or end portion of base 22 and liner 44. For example, first end wall member 66 attach to a horizontal end portion of base 22 and a corresponding part of perimeter portion 48 of liner 44. End wall members 64 may be made of any suitable material(s), such as steel.

Each of end wall members 64 includes a base interface side or portion 74, a liner interface side or portion 76 spaced from the base interface portion, and one or more connecting portions 78 disposed therebetween. A corresponding side or end portion of base 22 attaches to base interface portion 74. A corresponding part of perimeter portion 48 of liner 44 attaches to liner interface portion 76 such that the corresponding part of the perimeter portion is disposed between liner interface portion 76 and perimeter gasket 54. In the example shown in FIGS. 1-8, the base interface portion and the liner interface portion are parallel to each other, while the connecting portion is perpendicular to those portions. However, other examples of end wall members 64 may include portions that are not parallel and/or not perpendicular to each other. Each of end wall members 64 includes a plurality of apertures 80 to allow lock bars and/or crank rods of a locking mechanism of door assembly 20 (further discussed below) to engage apertures on the door frame. First and second end wall members 66, 68 each includes a base member 82 and a pair of corner elements 84 attached to opposition longitudinal end portions of the base member. Third and fourth end wall members 70, 72 include a base member 86 but without corner elements. Each of base members 82 and 86 is a unitary and/or formed structure but may, in other examples, be two or more structures attached (e.g., welded) together.

Base 22, liner 44, and end wall members 64 collectively define an interior compartment 88 therebetween that contains insulation or insulation material(s) 90 (e.g., foam or fiber insulation). All or substantial portions of the interior compartment includes insulation 90. End wall members 64 are shaped such that the amount of insulation 90 adjacent to perimeter gasket 54 is maximized. In other words, the end wall members are shaped such that insulation 90 is disposed within one or more planes 92 that are perpendicular to base 22 and liner 44 (e.g., the perimeter portion) and that include a portion of perimeter gasket 54. In the example in FIGS. 1-8, the end wall members are shaped such that insulation 90 is disposed within all planes 92 that are perpendicular to base 22 and liner 44 (e.g., the perimeter portion) and that include a portion of perimeter gasket 54. In other words, every plane 92 that is perpendicular to base 22 and liner 44 and that includes a portion of perimeter gasket 54 includes insulation 90 within that same plane. In the example in FIGS. 1-8, connecting portions 78 are beyond the above planes or are in planes 94 that are perpendicular to base 22 and liner 44 (e.g., the perimeter portion) and that do not include a portion of the perimeter gasket.

Door assembly 20 further includes a plurality of insulation panels 96 attached to central portion 46. The insulation panels span all or at least a substantial portion of the central portion. In the example shown in FIGS. 1-8, insulation panels 96 collectively span the entire central portion except for elevated part 52. Each of the insulation panels includes a plurality of channels 98, such as the curvilinear channels best shown in FIGS. 2 and 7. The insulation panels may be made of any suitable material(s).

Figure 3:
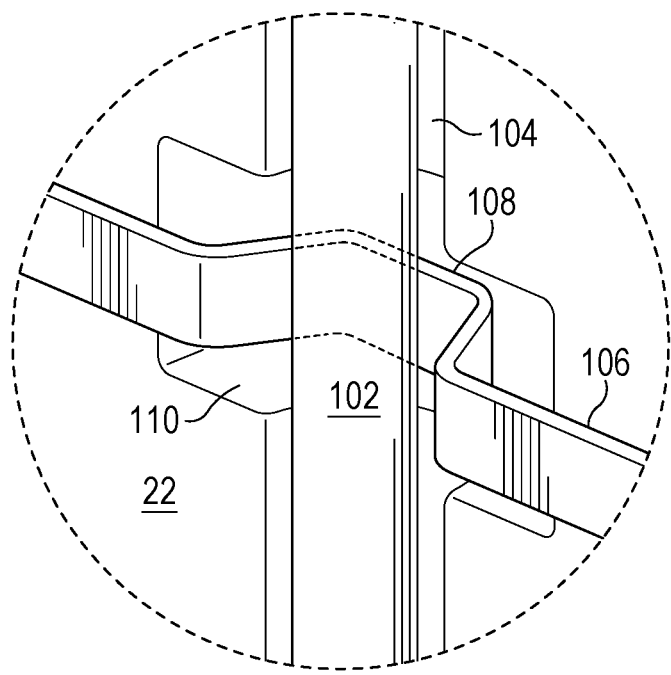
FIGS. 3-4 are partial views showing examples of lockbars of the door assembly of FIG. 1.
Figure 4:
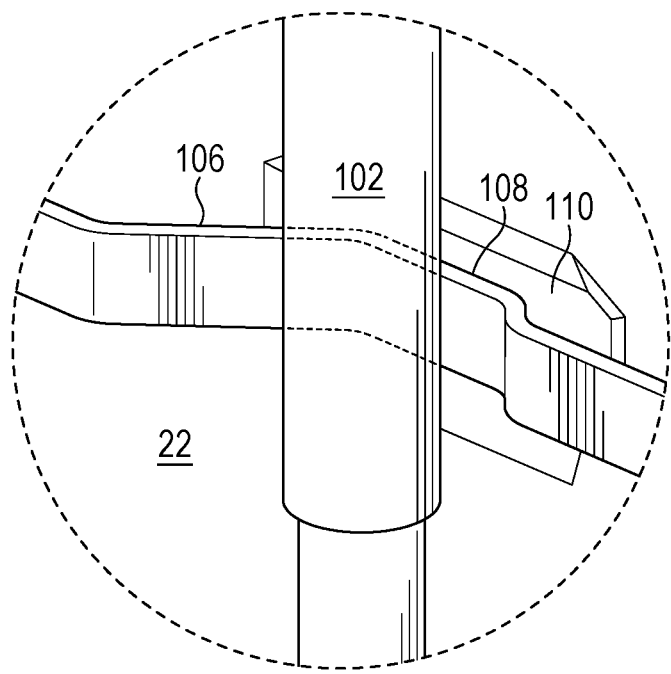
Figure 6:
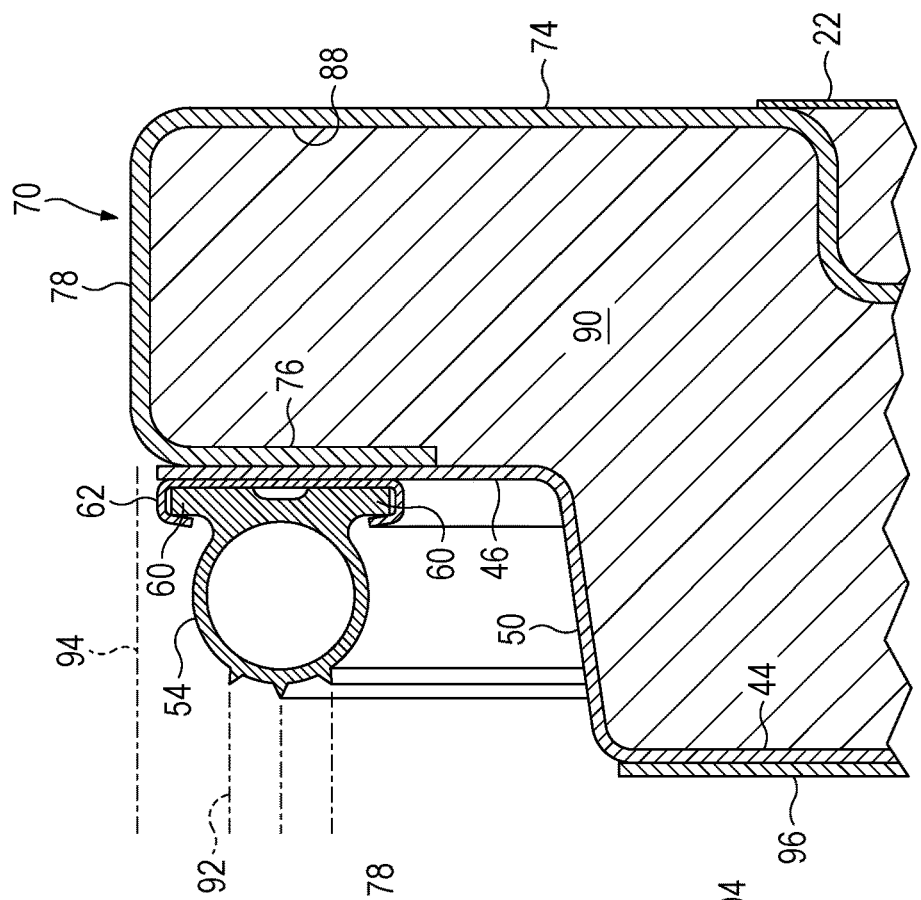
FIG. 6 is another sectional view taken along lines 6-6 in FIG. 2, showing another example of an end wall member of the door assembly of FIG. 1.
Figure 5:
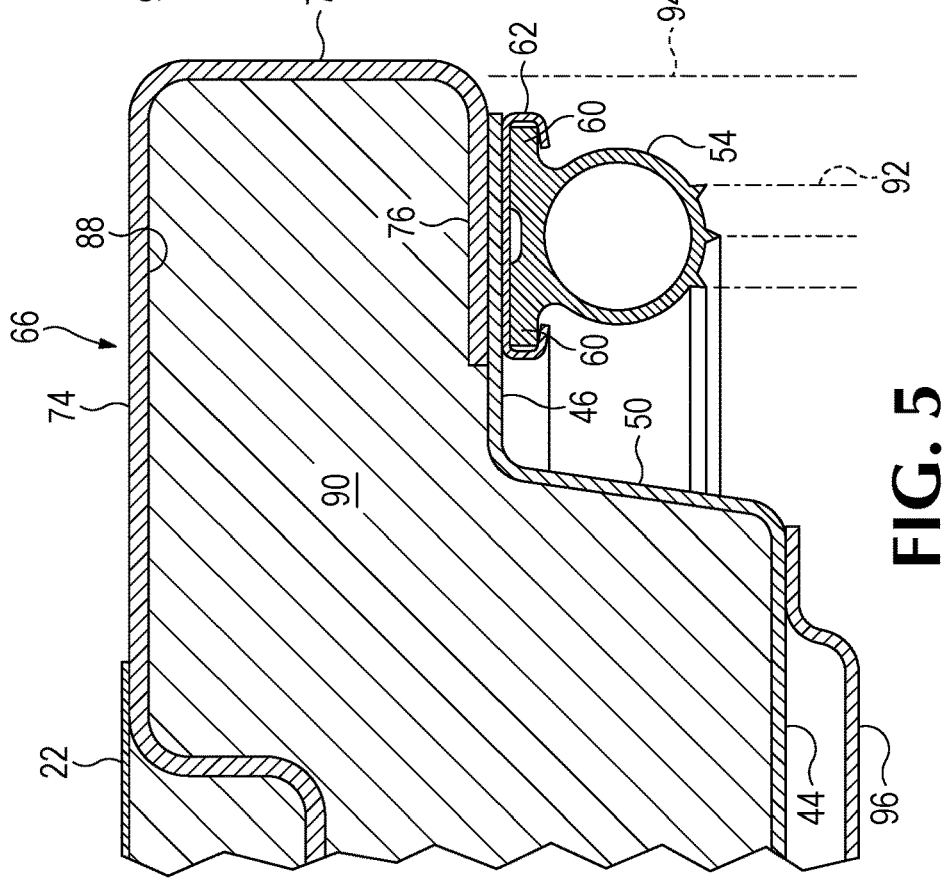
FIG. 5 is sectional view taken along lines 5-5 in FIG. 2, showing an example of an end wall member of the door assembly of FIG. 1.
Figure 7:
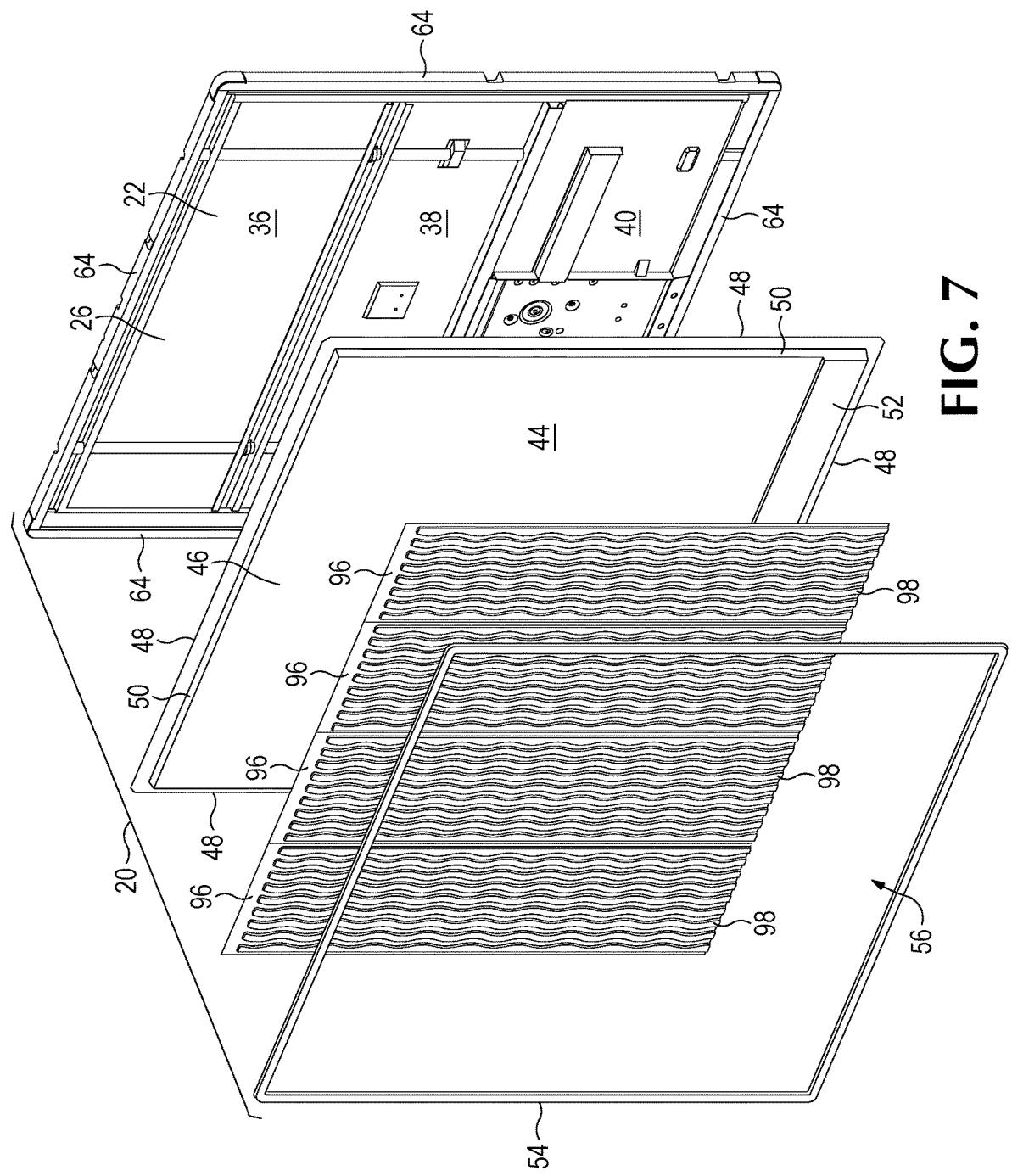
FIG. 7 is an exploded view of the door assembly of FIG. 1.
Figure 8:
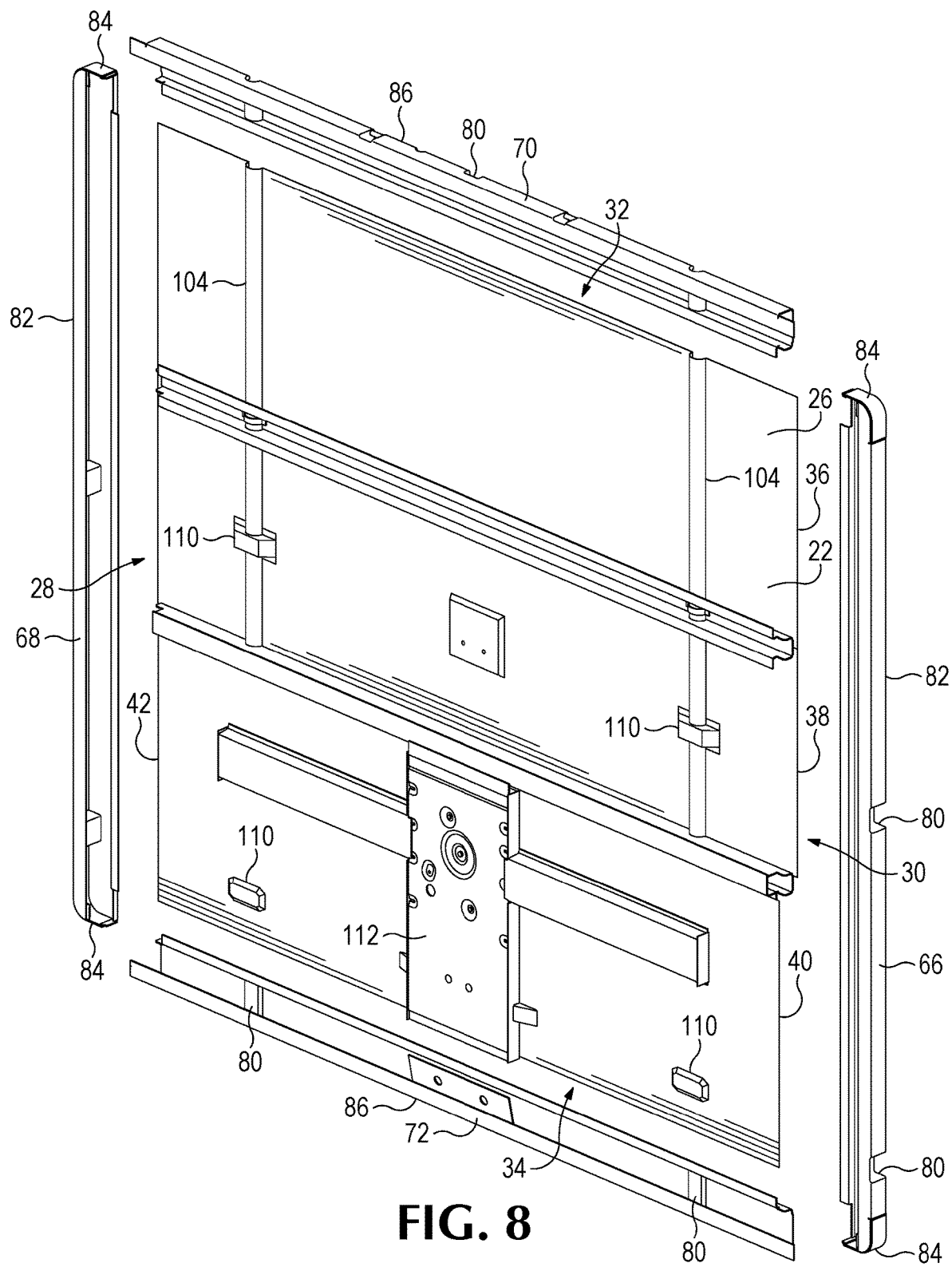
FIG. 8 is an isometric view of a base of the door assembly of FIG. 1 shown with end wall assemblies exploded.
Figure 9:
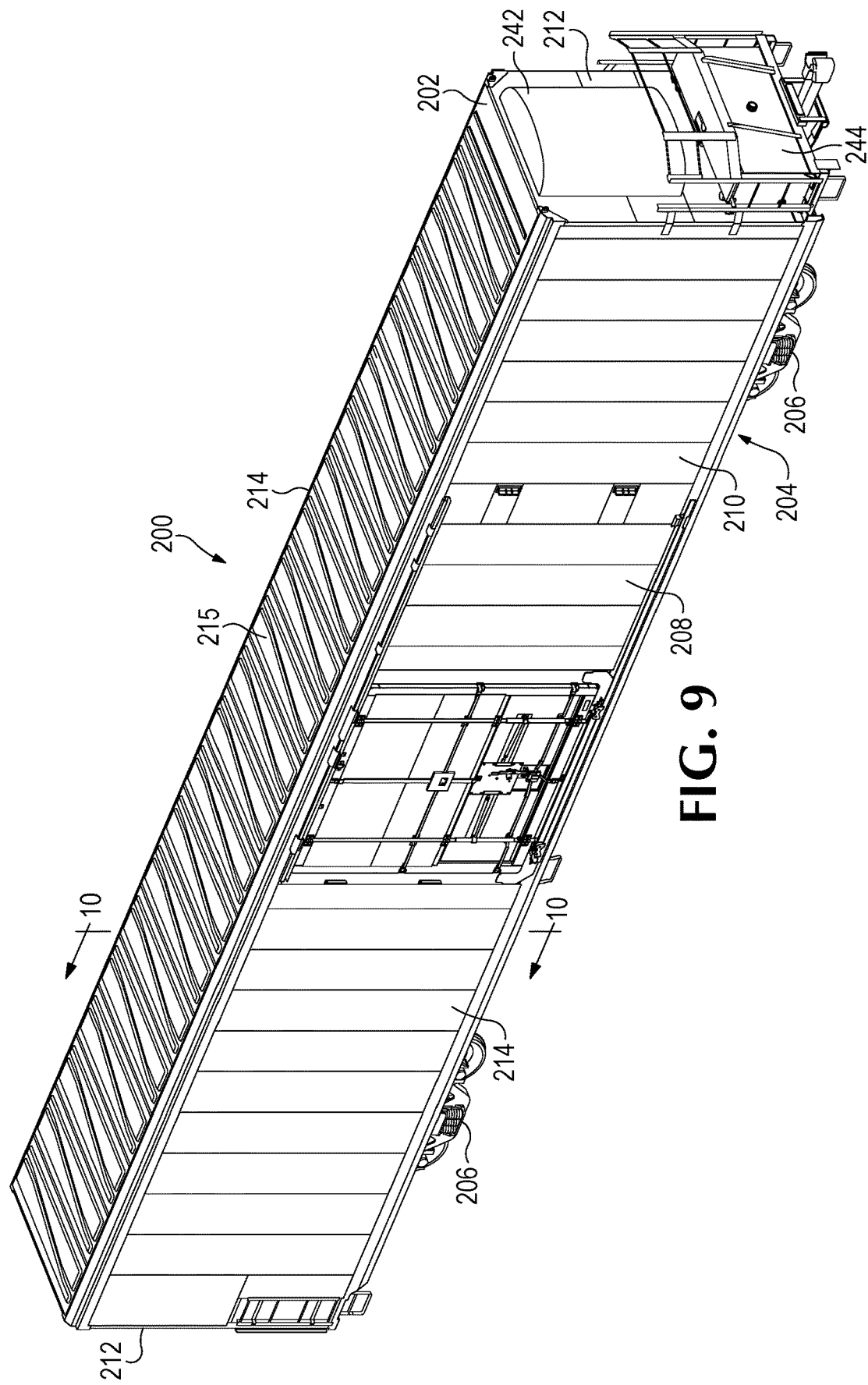
FIG. 9 is an isometric view of an example of a refrigerated boxcar having the door assembly of FIG. 1.
Figure 10:
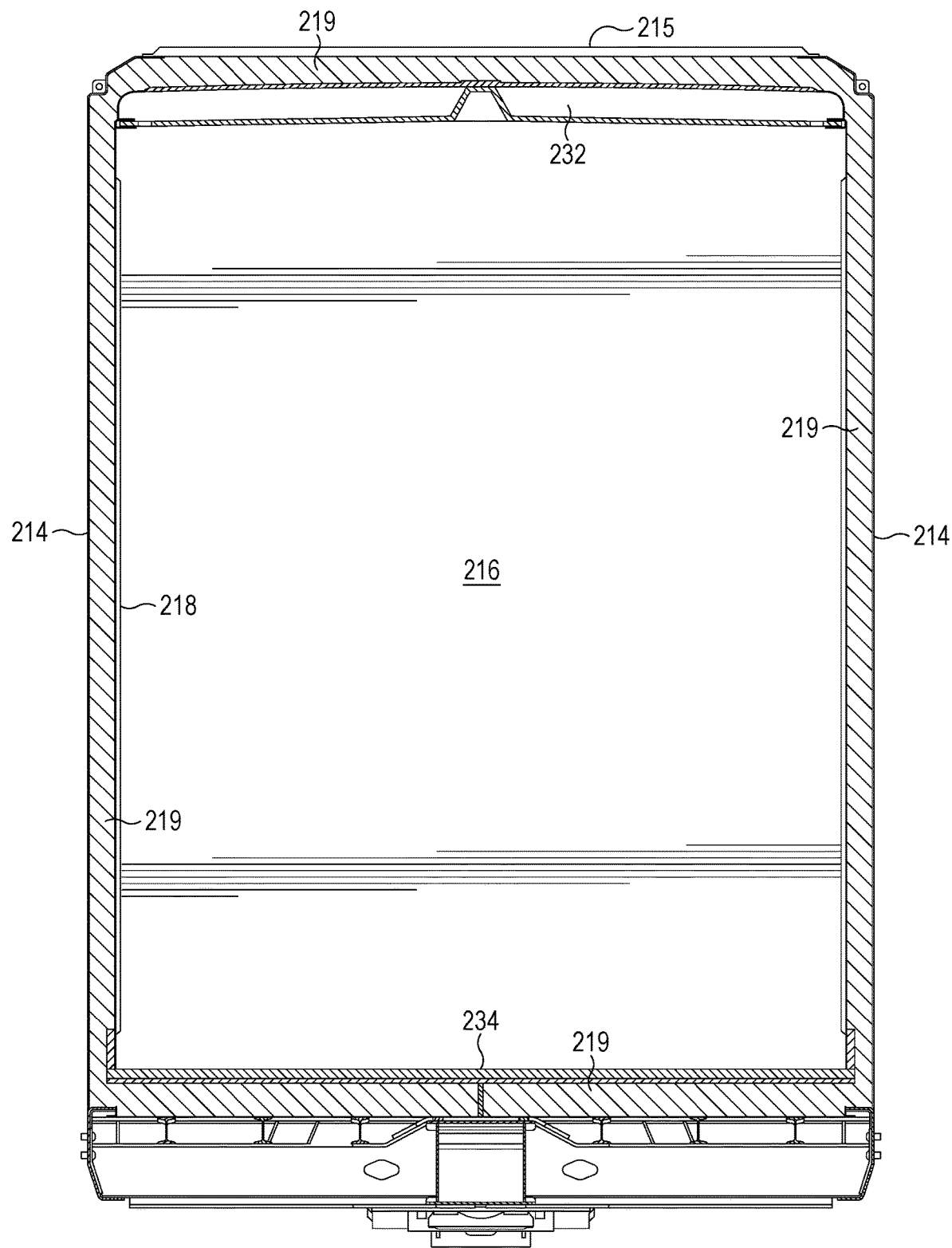
FIG. 10 is a sectional view of the refrigerated boxcar of FIG. 9 taken along lines 10-10 in FIG. 9.

Door assembly 20 additionally includes a locking mechanism 100 that selectively secures or locks door assembly 20 to the door frame of an insulated boxcar or a refrigerated boxcar. Locking mechanism 100 includes elongate crank rods 102 received in vertical channels 104 of base 22. In the example shown in FIGS. 1-8, vertical channels 104 are parallel and spaced to each other and extend along a portion of the height of base 22. The locking mechanism additionally includes one or more horizontal lock bars 106 that extends perpendicular to the crank rods. The horizontal lock bars include curved portions 108 that wrap around a portion of the crank rods such that the curved portions are received in horizontal channels 110 that are connected or fluidly connected to vertical channels 104 and such that the curved portions are disposed between base 22 and crank rods 102, as shown in FIGS. 1 and 3-4.

Figure 11:
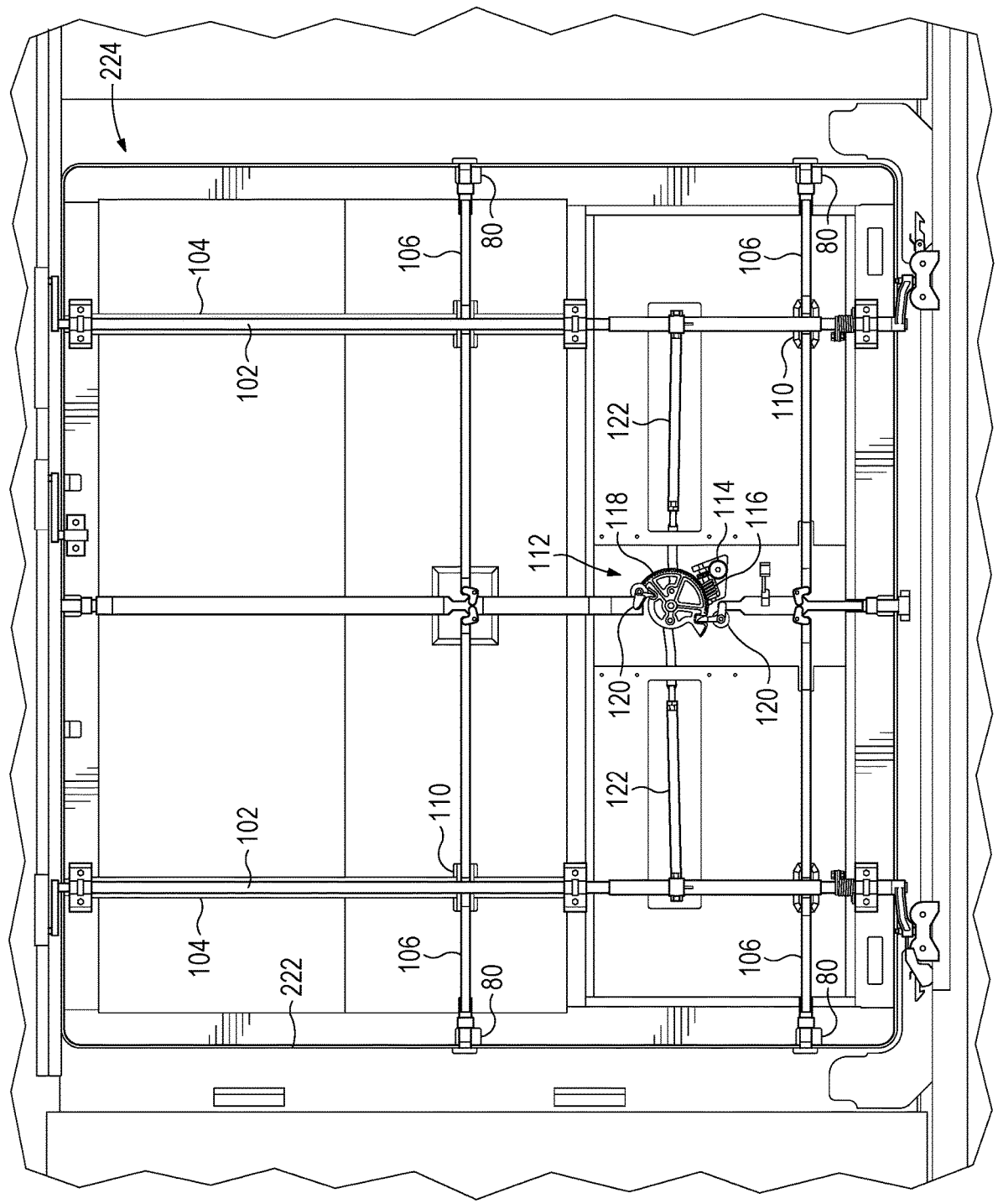
FIGS. 11-12 are partial views of the refrigerated boxcar of FIG. 9 showing the door assembly in closed and partially open positions.
Figure 12:
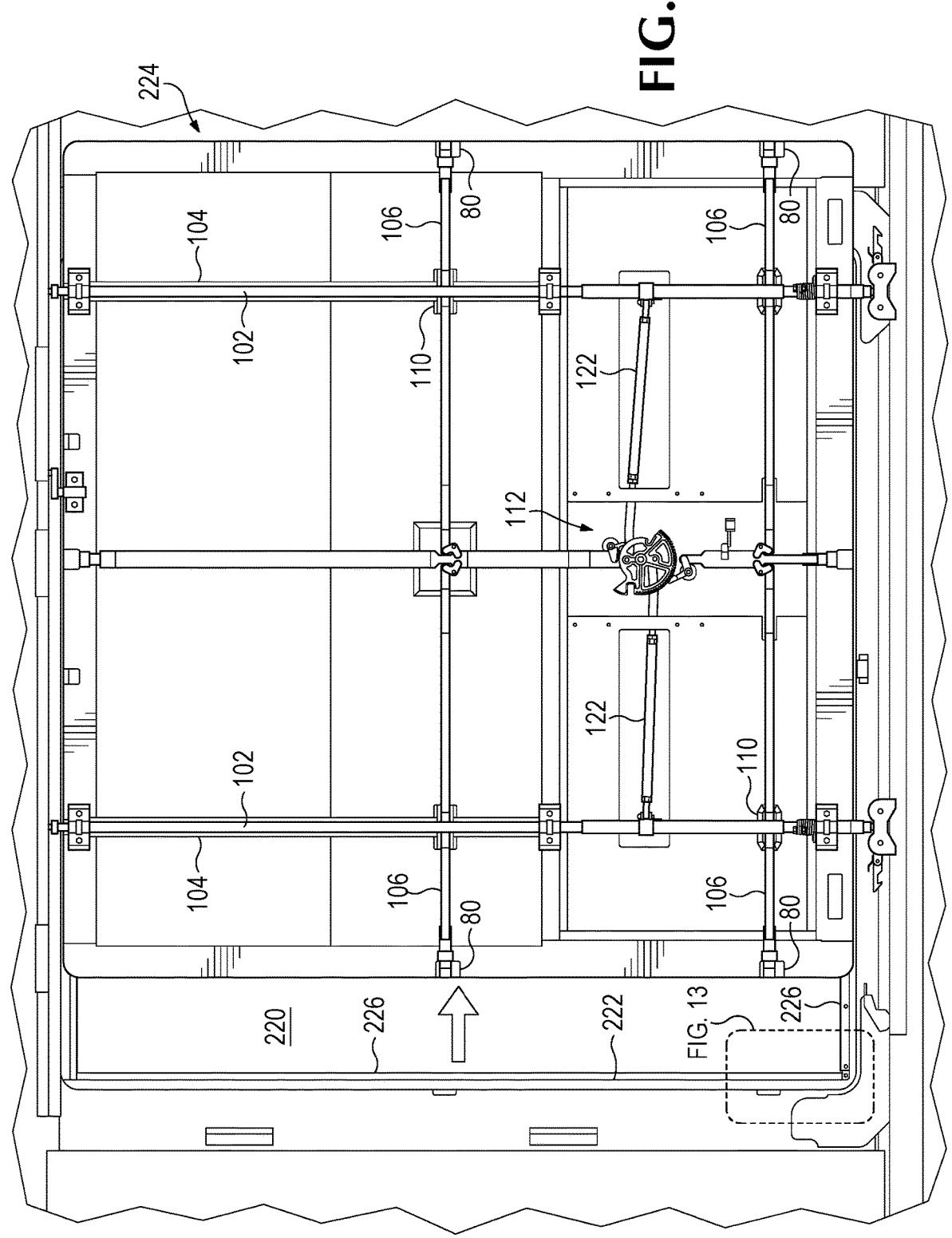
Figure 13:
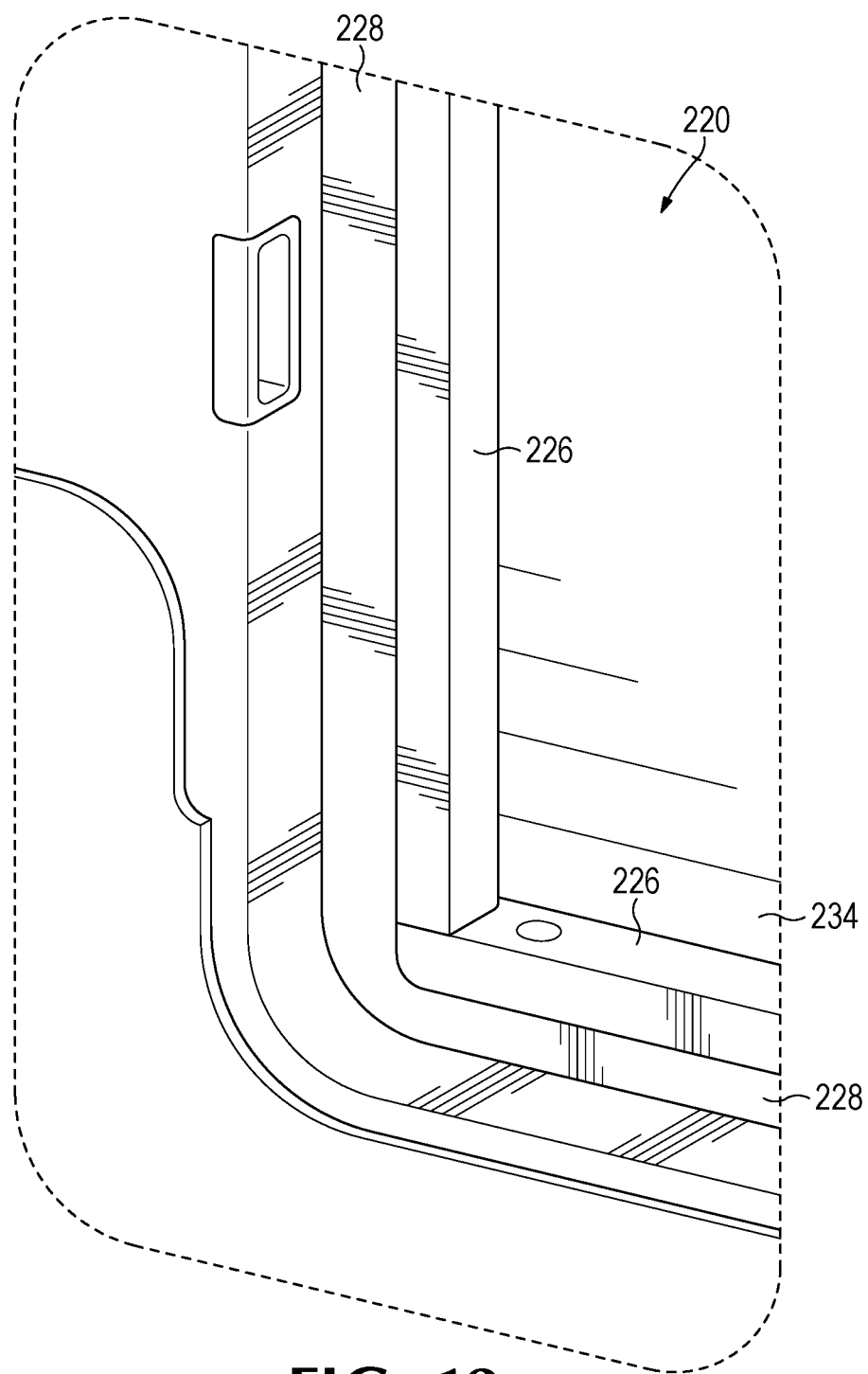
FIG. 13 is a partial view of the refrigerated boxcar of FIG. 9 showing an example of a door frame assembly.
Figure 14:
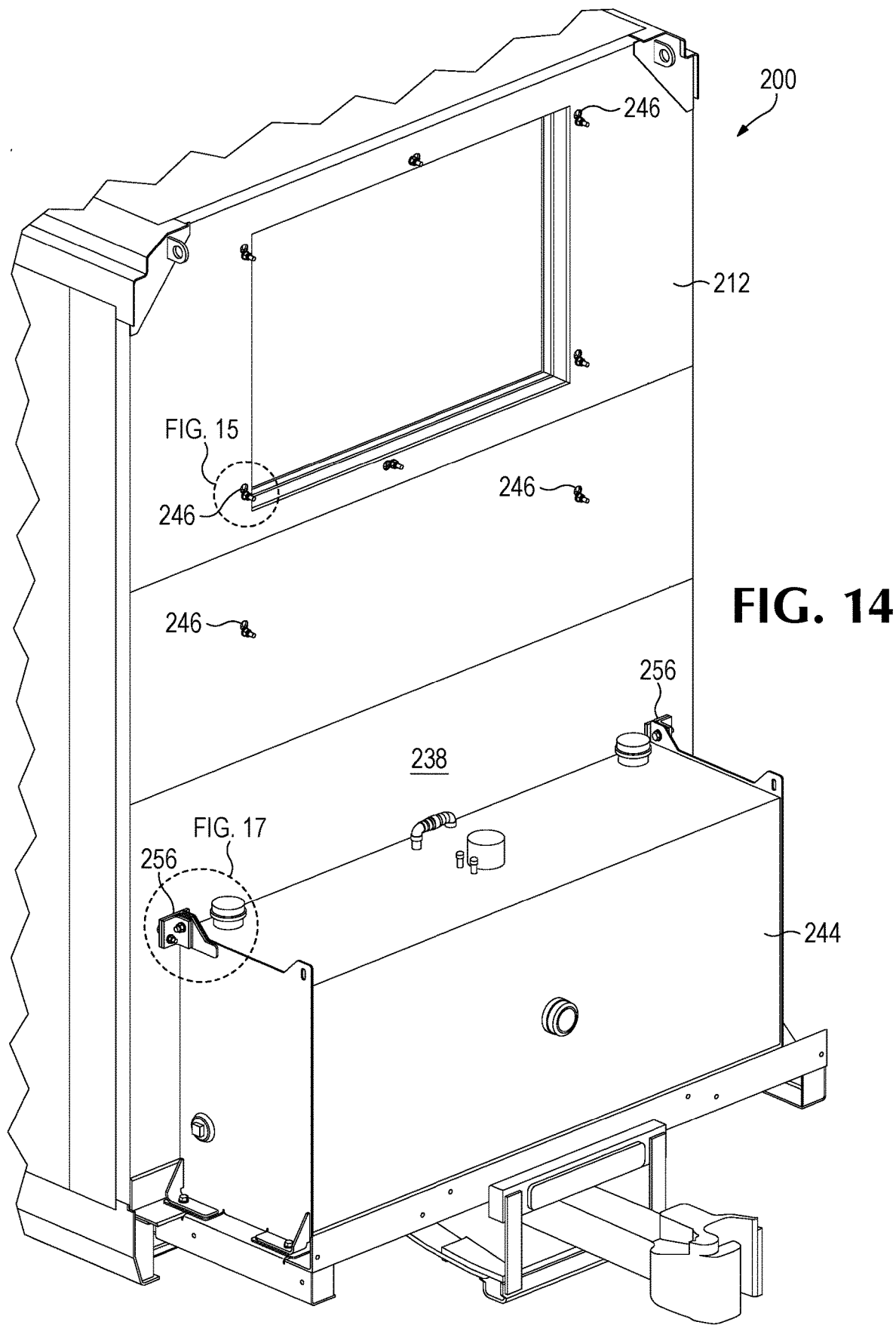
FIG. 14 is a partial view of the refrigerated boxcar of FIG. 9 showing an example of an end wall having a fuel tank attached and keyhole-shaped slots for attaching a refrigeration unit.
Figure 15:
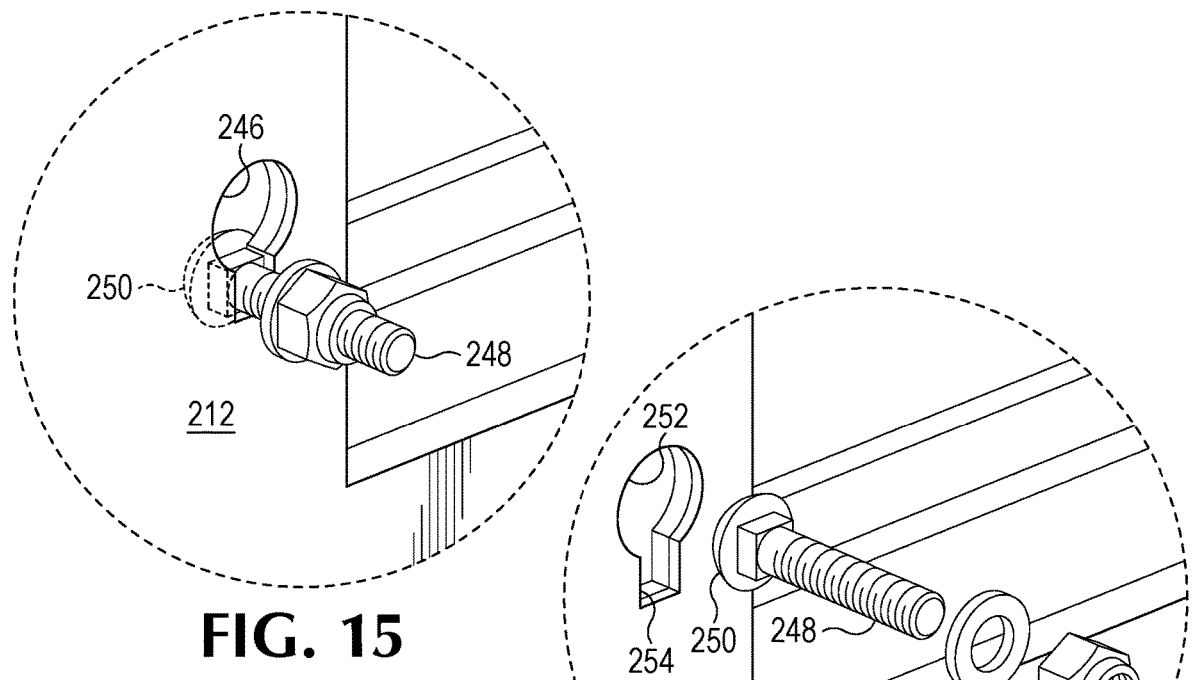
FIGS. 15-16 are partial views of an example of a connection assembly used with a keyhole-shaped slot of the refrigerated boxcar of FIG. 9.
Figure 16:
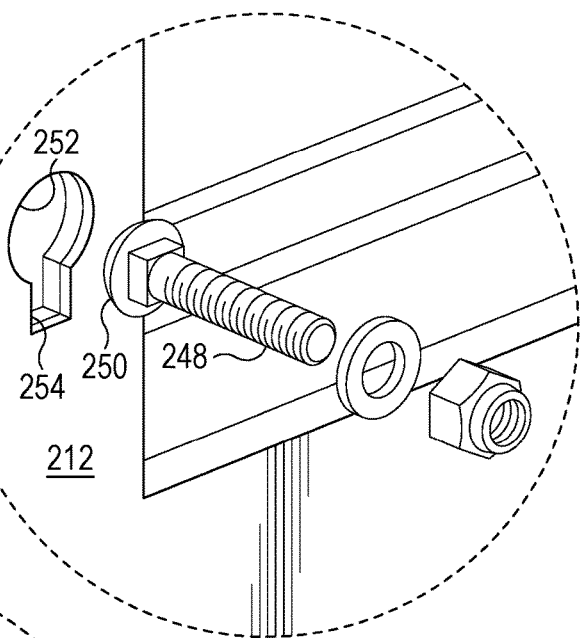
Figure 17:
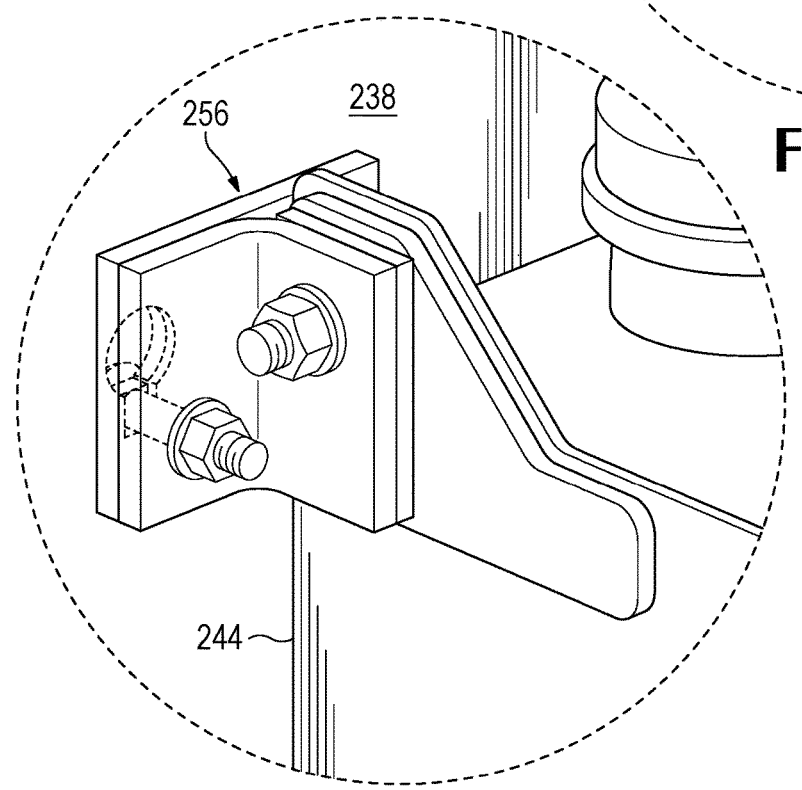
FIG. 17 is a partial view of an example of a mounting assembly for the fuel tank of FIG. 14.

Locking mechanism 100 further includes a lock gear assembly 112 that mechanically connects crank rods 102 and lock bars 106. As best shown in FIGS. 11-12, the lock gear assembly includes a drive gear 114, a pinion gear 116, a locking gear 118, actuator cams 120, and connecting rod assemblies 122. A handle 124 is attached to drive gear 114 for rotating the drive gear. Locking gear 118 is rotatably engaged with drive gear 114 via pinion gear 116. Actuator cams 120 and connecting rod assemblies 122 are attached to locking gear 118. Rotation of handle 124 allows a user to move the crank rods and the lock bars between the disengaged or unlocking position and the engaged or locking position. Locking mechanism 100 additionally includes a cover 126 to cover or substantially cover the drive gear, the pinion gear, the locking gear, and the actuator cams. The locking mechanism is substantially similar to the locking mechanism disclosed in U.S. Pat. No. 5,467,558, which is hereby incorporated by reference for all purposes.

Referring to FIGS. 9-17, a refrigerated boxcar 200 is shown. The refrigerated boxcar includes a cargo-carrying container or enclosure 202 supported by an undercarriage 204 and a plurality of wheeled trucks 206 that facilitate movement of the refrigerated boxcar along a rail track.

Cargo-carrying enclosure 202 has an outer enclosure 208 defining an outwardly-facing exterior surface 210. The outer enclosure includes a pair of end walls 212, a pair of side walls 214, and a top roof member 215. The cargo-carrying enclosure additionally includes an inner enclosure 216 defining an inwardly directed interior surface 218 against which cargo can bear and which is exposed to an interior environment. In the intervening space between the inner and outer enclosures is insulation 219 (e.g., foam insulation), unless that space is occupied by other structure(s) and/or structural reinforcement(s) (e.g., side posts).

The outer and inner enclosures include openings 220 defined by door frame assemblies 222 and a door or door assembly 224 covering each of those openings. The door assembly is substantially similar or identical to door assembly 20. Each of door frame assemblies 222 includes an inner door frame 226 defining opening 220 and an outer door frame 228 surrounding the inner door frame. The inner and outer door frames may be made of any suitable materials, such as one or more plastic materials for the inner door frames and/or steel for the outer door frames. The outer door frame is continuous (no gaps or gaps filled with welds) to provide a continuous sealing surface at the threshold to minimize air infiltration. The perimeter gasket of door assembly 224 contacts at least a portion of each of the inner and outer door frames when the door assembly is in the closed position. Inner enclosure 216 includes an air plenum or air duct assembly 232 and a floor 234 (e.g., aluminum floor).

A refrigeration unit 242 and a fuel tank 244 are attached to one of end walls 238, which includes apertures 246. In the example shown in FIGS. 9-17, apertures 246 receive fasteners 248 and are keyhole-shaped to provide easy access and removal of the refrigeration unit and/or fuel tank from outside the refrigerated boxcar. For example, head 250 of fastener 248 may received in main portion 252 of aperture 246. In other words, the diameter of head 250 is less than the diameter of main portion 252 but greater than the width of key portion 254 of aperture 246. Fuel tank 244 is attached to end wall 238 via a bracket assemblies 256.

Although refrigerated boxcar 200 is shown to include door assembly 224 that is substantially similar or identical to door assembly 20, the present disclosure includes insulated boxcars having a door assembly that is substantially similar or identical to door assembly 20 and that includes a similar construction as refrigerated boxcar 200 but without certain components specific to refrigerated boxcars, such as the air plenum, refrigeration unit, and fuel tank. For example, insulative railway boxcar disclosed in U.S. Pat. No. 9,174,656 may include a door assembly that is substantially similar or identical to door assembly 20. The complete disclosure of the above patent is hereby incorporated by reference for all purposes.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A door assembly for an insulated boxcar or a refrigerated boxcar, the door assembly comprising:
   a generally planar base having front and rear surfaces, opposed horizontal end portions, and opposed vertical end portions;
   a liner spaced from the rear surface of the base, the liner having a central portion and a perimeter portion surrounding the central portion, the central portion being more spaced from the base relative to the perimeter portion, the perimeter portion being adjacent to the horizontal and vertical end portions;
   a perimeter gasket attached to the perimeter portion and surrounding the central portion;
   a first end wall member having spaced first and second portions, the first portion is attached to the first end portion of the base and the second portion is attached to the third end portion of the perimeter portion, the third end portion being disposed between the first portion and the perimeter gasket;
   a second end wall member having spaced fourth and fifth portions, the fourth portion is attached to the second end portion of the base and the fifth portion is attached to the perimeter portion, the perimeter portion being disposed between the fourth portion and the perimeter gasket, wherein each of the first and second end wall members is distinct from the base and the liner, wherein the base is distinct from the liner, and wherein the base, the liner, and the first and second end wall members define an interior compartment therebetween; and
   insulation disposed within the interior compartment, wherein the first and second end wall members are shaped such that insulation is disposed within one or more planes that are perpendicular to the base and to the perimeter portion of the liner and that include a portion of the perimeter gasket.

2. The door assembly of claim 1, wherein the first end wall member further includes a third portion disposed between the first and second portions, and the second end wall member further includes a sixth portion disposed between the fourth and fifth portions.

3. The door assembly of claim 2, wherein the first and second portions of the first end wall member are parallel to each other, and the fourth and fifth portions of the second end wall member are parallel to each other.

4. The door assembly of claim 3, wherein the third portion is perpendicular to the first and second portions, and the sixth portion is perpendicular to the fourth and fifth portions.

5. The door assembly of claim 4, wherein the third and sixth portions are along planes that do not include a portion of the perimeter gasket.

6. The door assembly of claim 1, wherein the first and second end wall members are shaped such that insulation is disposed within all planes that are perpendicular to the base and to the perimeter portion of the liner and that include a portion of the perimeter gasket.

7. The door assembly of claim 1, wherein the front surface of the base includes two vertical channels that extend along a portion of the height of the base, the two channels being parallel and spaced to each other.

8. The door assembly of claim 7, further comprising a locking mechanism that selectively secures the door assembly to a frame of the insulated boxcar or the refrigerated boxcar, wherein the locking mechanism includes:
   two elongate crank rods each received in a corresponding vertical channel of the two vertical channels;
   at least one horizontal lock bar that extends perpendicular to the two elongate crank rods, the at least one horizontal lock bar having two curved portions that each wrap around a portion of a corresponding crank rod of the two elongate crank rods such that the curved portions are disposed between the two elongate crank rods and the base;

a lock gear assembly mechanically connecting the two elongate crank rods and the at least one horizontal lock bar; and a handle attached to the lock gear assembly to allow the user to engage or disengage the crank rods and the at least one horizontal lock bar.

9. The door assembly of claim 8, wherein the front surface of the base includes at least two horizontal channels that receives the two curved portions.

10. The door assembly of claim 9, wherein each of the at least two horizontal channels is connected to a corresponding vertical channel of the two vertical channels.

11. A railway car, comprising
a cargo-carrying container having an opening; and
the door assembly of claim 1.

12. The railway car of claim 11, wherein the cargo-carrying container includes a door frame assembly, the door frame assembly including an inner door frame defining the opening and an outer door frame surrounding the inner door frame, the inner door frame being made of one or more plastic materials and the outer door frame being made of steel, wherein the perimeter gasket contacts at least a portion of each of the inner and outer door frames when the door is in a closed position.

13. The railway car of claim 11, wherein the cargo-carrying container includes a pair of end walls and a pair of side walls, further comprising a fuel tank mounted on an end wall of the pair of end walls.

14. The railway car of claim 13, wherein the end wall includes a plurality of keyhole-shaped apertures.

15. The railway car of claim 14, further comprising a refrigeration unit attached to the end wall via a plurality of fasteners received in the plurality of keyhole-shaped apertures.

16. The railway car of claim 11, wherein the cargo-carrying container is at least partially insulated.

17. The railway car of claim 11, further comprising at least one refrigeration unit.

* * * * *